United States Patent
Uchiyama et al.

(10) Patent No.: US 7,397,930 B2
(45) Date of Patent: Jul. 8, 2008

(54) POSITION AND ORIENTATION ESTIMATING METHOD AND APPARATUS

(75) Inventors: Shinji Uchiyama, Kanagawa (JP); Kiyohide Satoh, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 569 days.

(21) Appl. No.: 10/943,550

(22) Filed: Sep. 17, 2004

(65) Prior Publication Data
US 2005/0069174 A1 Mar. 31, 2005

(30) Foreign Application Priority Data
Sep. 30, 2003 (JP) ............................. 2003-341625

(51) Int. Cl.
*G06K 9/00* (2006.01)
(52) U.S. Cl. .................. 382/103; 348/207.99; 702/104
(58) Field of Classification Search ................. 382/100, 382/106, 107, 162, 165, 181, 190, 195, 199, 382/201, 203, 254, 255, 266, 274; 348/207.99, 348/208.4, 207.13; 345/418, 419, 427, 428, 345/589, 156, 158, 162; 702/85, 91, 92, 702/93, 104
See application file for complete search history.

(56) References Cited

U.S. PATENT DOCUMENTS

| | | | | |
|---|---|---|---|---|
| 6,522,312 | B2* | 2/2003 | Ohshima et al. ............... | 345/8 |
| 6,556,722 | B1* | 4/2003 | Russell et al. ............... | 382/291 |
| 6,741,241 | B1* | 5/2004 | Jaubert et al. ............... | 345/419 |
| 6,798,443 | B1* | 9/2004 | Maguire, Jr. ................. | 348/121 |
| 6,834,250 | B2* | 12/2004 | Uchiyama et al. ........... | 702/150 |
| 7,038,699 | B2* | 5/2006 | Sato et al. .................... | 345/633 |
| 7,230,741 | B2* | 6/2007 | Ernandes et al. ............. | 358/3.1 |
| 2002/0075286 | A1* | 6/2002 | Yonezawa et al. ........... | 345/679 |
| 2002/0103617 | A1 | 8/2002 | Uchiyama et al. | |
| 2003/0103617 | A1* | 6/2003 | Brown et al. ............ | 379/265.02 |
| 2003/0144813 | A1* | 7/2003 | Takemoto et al. ........... | 702/153 |
| 2004/0080548 | A1* | 4/2004 | Daily et al. .................. | 345/850 |

FOREIGN PATENT DOCUMENTS

| | | |
|---|---|---|
| JP | 2000-041173 | 2/2000 |
| JP | 2002-081251 | 3/2002 |

OTHER PUBLICATIONS

Bajura Michael and Ulrich Neuman: Dynamic registration correction in video-based-augmented reality systems, IEEE Computer Graphics and Applications 15, 5, pp. 52-60, 1995.
A. State, G. Hirota, D. T. Chen, W. Garrett, and M. Livingston: Superior augmented reality registration by integrating landmark tracking and magnetic tracking, Proc. SIGGRAPH'96 pp. 429-438, Jul. 1996.

* cited by examiner

*Primary Examiner*—Anand Bhatnagar
(74) *Attorney, Agent, or Firm*—Canon U.S.A., Inc., I.P. Division (57) ABSTRACT

A position and orientation estimating method and apparatus are disclosed in which position and orientation measured values are acquired from an image pickup device, and in which an index is detected from an image of a real space photographed by the image pickup device, and identified. By using the index obtained, correction values for correcting position and orientation measured values are calculated. Correction values at a current time are calculated using the calculated corrected values together with correction values for past n-times. The obtained correction values at the current time are stored and accumulated, and the position and orientation measured values are corrected by the correction values at the current time. If the detection or identification of the index ends in failure, the position and orientation measured values are corrected by using correction values obtained in the past.

14 Claims, 3 Drawing Sheets

FIG. 2

POSITION AND ORIENTATION ESTIMATING METHOD AND APPARATUS

CROSS REFERENCE TO RELATED APPLICATIONS

This application claims priority from Japanese Patent Application No. 2003-341625 filed Sep. 30, 2003, which is hereby incorporated by reference herein.

BACKGROUND OF THE INVENTION

1. Field of the Invention

The present invention relates to techniques for estimating a position and orientation of a camera that picks an image of a real space or an object movable in the real space.

2. Description of the Related Art

The measurement of a position and orientation of the image-pickup section of a camera that picks an image of a real space (hereinafter, the image-pickup section of a camera is simply referred to as a "camera"), is needed for a mixed reality system that displays a real space and a virtual space in an integral manner. A position and position sensor, such as a magnetic sensor, is used for the measurement of the position and orientation of a camera. Its measurement accuracy, however, is not sufficient for being used in the mixed reality system. With this being the situation, the improvement in its measurement accuracy with respect to position and orientation is usually effected by correcting measurement values. As such correction methods, the following four types of methods have been proposed.

First Method

A position and orientation of a camera are measured by a position and orientation sensor such as a magnetic sensor mounted on a camera, and the measurement error of the position and orientation sensor is corrected by using markers of which the positions in a real space are known, or characteristic points of which the positions disposed in a real space are known (hereinafter, markers and characteristic points are collectively referred to as "indices"). This correction method is disclosed in the following patent documents: (1) Japanese Patent Laid-Open No. 11-136706 (corresponding U.S. Pat. No. 6,522,312) (hereinafter "JP 11-136706"), (2) Japanese Patent Laid-Open No. 2000-041173, and (3) Japanese Patent Laid-Open No. 2002-228442 (corresponding U.S. Published patent application No. US20020103617 A1). The present correction method is also set forth in the following non-patent documents: (1) Bajura Michael and Ulrich Neuman: "Dynamic registration correction in video-based-augmented reality systems", IEEE Computer Graphics and Applications 15,5, pp. 52-60, 1995; and (2) A. State, G. Hirota, D. T. Chen, B. Garrett, and M. Livingston: "Superior augmented reality registration by integrating landmark tracking and magnetic tracking", Proc. SIGGRAPH '96, pp. 429-438, July 1996 (hereinafter, "A. State"). This correction method, perceiving it as a problem that the position and orientation sensor, such as a magnetic sensor, is lacking in the measurement accuracy with respect to the position and orientation of a camera used in a mixed reality system, corrects measured values by the sensor using information about indices themselves and information based on the detected results of indices from an image. That is, the first method is a method for correcting measured values by the position and orientation sensor using indices, and is effective as a method for performing high-accuracy position and orientation measurement.

Second Method

In the second method, when a measurement error of the sensor is to be corrected, the correction values for a current frame are calculated by using the correction values for a preceding frame and those for the current frame. This method is disclosed in the aforementioned patent document (1) (JP 11-136706). The second method is used when a plurality of indices is employed, and serves as a processing method for changing over between employed indices. According to this method, the discontinuity of correction values in making a changeover between indices can be smoothed. Thus, in the second method, the correction value for the current frame is calculated by making use of the correction values for the preceding frame and those for the current frame.

Third Method

The third method is a method proposed by Japanese Patent Application No. 2002-081251. According to circumstances, the estimating method for the position and orientation of a camera is changed over. Possible methods for determining a position and orientation include a variety of methods, each having its own advantage and disadvantage. The third method aims to perform a better position and orientation estimation by using a method obtained by selectively combining these "methods for determining a position and orientation", that is, by changing over the position and orientation estimating method as circumstances demand.

Fourth Method

The fourth method is a method for bridging the gap in measured value between a state where a correction by indices is provided and a state where a correction by indices is not provided (i.e., a state where measured values of a position and orientation sensor alone are provided). This method is set forth in the second paragraph in Section 7.1 in the aforementioned non-patent document (2) (A. State). According to a brief explanation of this document, when the situation is changed from a state where a correction by an image is provided to a state where a correction by an image is not provided, the estimation results of the position and orientation of a camera are gradually shifted to the measured values by the sensor. According to the method set forth in this non-patent document (2) (A. State), when the detection of indices eventuates in failure, the estimation results of the position and orientation are to be shifted to sensor's measurement values themselves having large errors.

Possible concrete techniques of the first method include a variety of techniques, each having its own advantage and disadvantage depending on conditions of indices captured by a camera. Accordingly, as in the third method, it is desirable to change over the correction method as circumstances demand. The third method is not limited to the techniques of the first method that corrects measurement values by the position and orientation sensor using indices, but it is a method applicable to the entire spectrum of the estimation of position and orientation. The third method would also be applicable to a case where techniques that are different from each other in correction method of the first method are mutually changed over therebetween. However, when the third method is applied, just as it is, to a method that is different in correction method, correction results of a position and orientation undesirably result in discontinuous values the moment when the correction method is changed over therebetween. This leaves room for improvement.

On the other hand, as a method that allows for position and orientation estimated values to become discontinuous, the second method 2 is proposed by the correction method disclosed in the patent document (1) (JP 11-136706). However, the second method is an invention that, when using a plurality of indices, perceives, as a problem, the discontinuity of position and orientation estimated values occurring when indices are changed over, and that solves this discontinuity. The second method does not go so far as to allow for and solve the changeover of the correction method of position and orientation.

The fourth method seems like processing without any problem. However, when, for example, an index is in a state of being sufficiently captured by a camera, if it is assumed that part of the index is hidden by hand without moving the camera, it will become apparent that this method has a problem. More specifically, in such a case, the estimation results should be originally the same between before and after the index is hidden by hand. However, according to the technique of the fourth method, if the index becomes non-capturable, sensor's measurement values are misidentified as position and orientation estimated values. As a result, although high accuracy position and orientation estimation has been secured before hiding the indices, the hiding of the index unfavorably brings about low accuracy estimation results including the errors inherent in sensor's measurement values in their entirety.

SUMMARY OF THE INVENTION

The present invention allows the elimination of the discontinuity of correction in performing a changeover between correction methods when estimating a position and orientation of a photographing device or an object while making a correction using an index or indices. Furthermore, the present invention prevents reduction in measurement accuracy occurring when the index or indices become unusable.

According to an aspect of the present invention, a method for estimating a position and orientation of an object in a real space, includes: inputting position and orientation measured values from a position and orientation sensor fixed to the object; inputting a picked-up image obtained by picking up an image of a real space by an image pickup device; detecting an index from the picked-up image; selecting a correction method, from a plurality of correction methods, for calculating correction values for correcting the position and orientation values; calculating correction values for correcting the position and orientation measured values based on the detected index, using the selected correction method; calculating correction values for a current time, based on the calculated correction values and a predetermined number of past correction values stored in a memory; accumulating in the memory the correction values for the current time; and correcting the position and orientation measured values, based on the calculated correction values for the current time.

When the index cannot be detected in the above-described method, position and orientation values may be corrected based on the correction values stored in the memory.

According to another aspect of the present invention, a method for estimating a position and orientation of an object in a real space includes: inputting position and orientation values from a sensor for measuring a position and an orientation; detecting a plurality of indices from the picked-up image obtained by picking up the image of a real space by an image pickup device; calculating correction values for correcting the position and orientation values based on the detection results of the plurality of indices; calculating correction values for a current time based on the calculated correction values and a predetermined number of correction values in the past that are stored in a memory; accumulating in the memory, the calculated correction values for the current time; and correcting the position and orientation values, based on the calculated correction values for the current time, wherein, when a predetermined number of the indices cannot be detected, the position and orientation values are corrected using the stored correction values.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Hereinafter, preferred embodiments according to the present invention will be described with reference to the accompanying drawings.

First Embodiment

Figure 1:
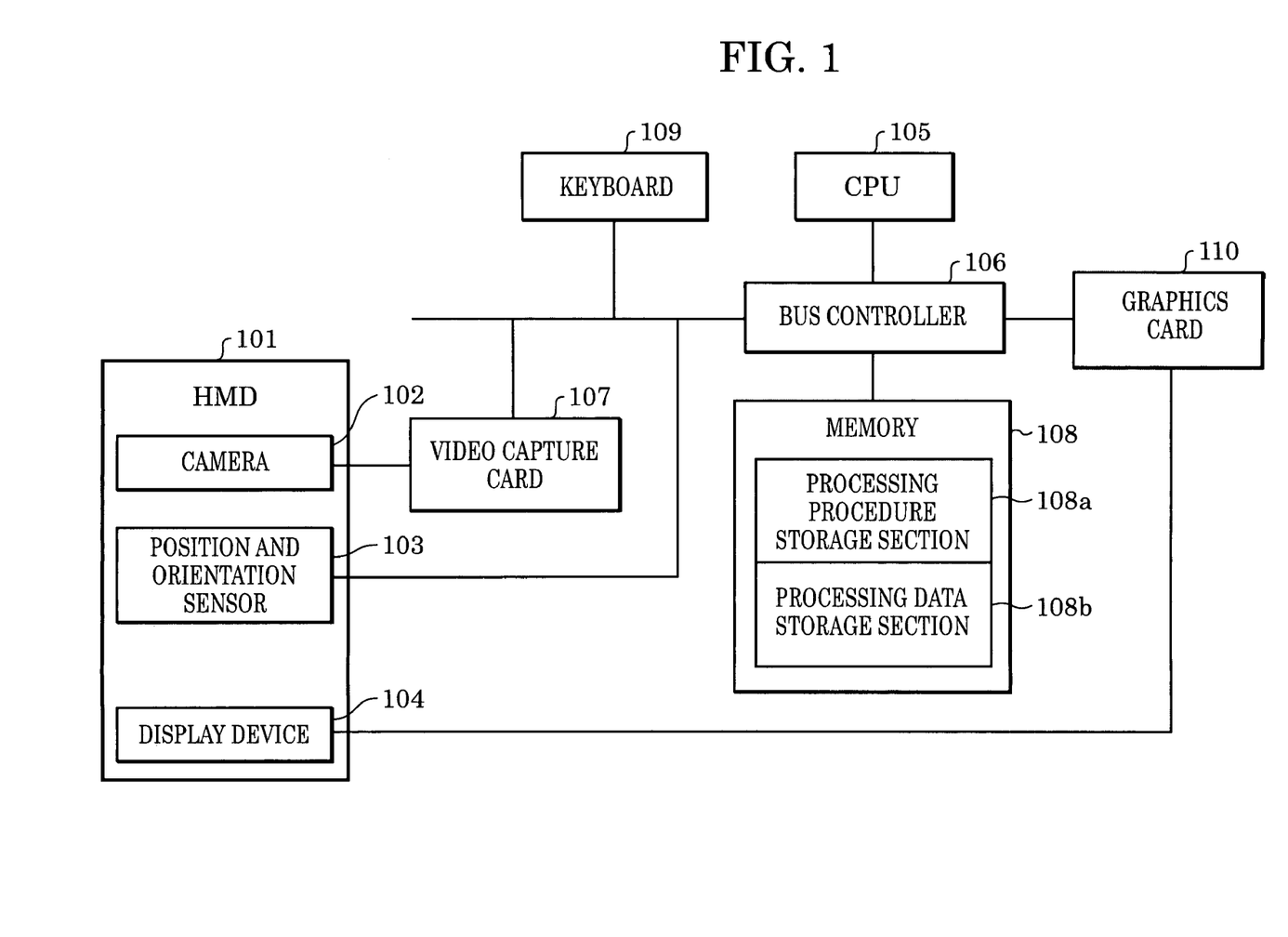
FIG. 1 is a block diagram showing the functional construction of an apparatus for implementing the position and orientation estimation processing according to a first embodiment of the present invention.

FIG. 1 shows a construction (block diagram for a system) for performing the position and orientation estimation processing according to a first embodiment of the present invention. Referring to FIG. 1, a head mount display (hereinafter, referred to as a "HMD") 101 includes a camera 102, position and orientation sensor 103, and display device 104. These are in a mutually fixed relation, and the position and orientation sensor 103 can measure the position and orientation of the camera 102.

A central processing unit (CPU) 105 controls devices included in the construction shown in FIG. 1, and executes the position estimation processing described later. A bus controller 106 connects devices with one another, such as the CPU 105 and a memory 108 included in this construction, and allows data transmission between these devices. A video capture card 107 receives video signals from the camera 102, and transfers them as digital data on a picked-up image, to the memory 108 through the bus controller 106.

The memory 108 stores (at a processing procedure storage section 108a) processing procedures to be performed in the CPU 105, and (at a processing data storage section 108b) data required in the process of position estimation processing, such as image data obtained from the video capture card 107. A keyboard 109 is used when an operator indicates the start or end of processing. A graphics card 110 controls the display of the display device 104 to display a mixed reality space obtained as a processing result. In FIG. 1, the display device 104 is fixed together with the camera 102 and position and orientation sensor 103. However, in this embodiment, although it is indispensable for the camera 102 and position and orientation sensor 103 to be mutually fixed, the display device 104 is not necessarily required to be fixed together with them.

Next, the position and orientation estimation processing that is performed, for example, in the apparatus with the above-described construction will be described with reference to a flowchart shown in FIG. 2.

First, in step S201, position and orientation measured values are acquired by the position and orientation sensor 103. On the other hand, in step S202, an image of a real space is picked up by the camera 102, and the picked-up image is transferred to the memory 108 (via transmission from video capture card 107 via the bus controller 106). In step S203, an index is detected from the picked-up image stored in the memory 108. The index may be a specified color area that is constituted of a seal-like object with a specified color, and that is artificially arranged in the real space in advance. Alternatively, the index may be a characteristic place existing in a real space scene. When using the specified color area as an index, a corresponding color area is detected from the image, and the barycenter of the color area is determined so that the position of the index captured in the image can be detected. On the other hand, when using the characteristic place as an index, the index is extracted by a technique such as pattern matching, and the position of the index can be detected based on the extraction result.

Then, in step S204, it is determined whether the index has been detected. If so, the processing advances to step S205. Otherwise, the processing advances to step S212. In step S205, on the basis of the position and orientation measured values of the camera (obtained in step S201) and the index detected (in step 203), an index of what in the real space is the index detected (in step S203) is identified. This is processing of making identification (step S205) by using the position and orientation measured values (step S201) from the position and orientation sensor 103 when the index seems non-unique at the stage where the index has been detected from an image (step S204). In step S206, it is determined whether there is an identified index. If so, the processing advances to step S207. Otherwise, the processing advances to step S212.

If the index is one that can be identified without using measured values by the sensor, i.e., if an index such that can be uniquely identified only by detecting from an image is used, the two steps S205 and S206 are unnecessary. In this case, if the index is detected in step S204, the subsequent processing becomes step 207, which is a step to which the processing is to advance when it is determined in step S206 that the index is identified. Here, as information used to identify an index, the position and orientation measured values by the position and orientation sensor 103 that have been obtained in step S201 are used. However, information used to identify an index is not restricted to the above. For example, it may be the position and orientation values after position and orientation measured values have been subjected to a correction (in step S211 or S214 described later), that is, it may be estimation values of position and orientation immediately before the current time. Alternatively, information used to identify an index may use position and orientation measured values obtained by correcting the position and orientation measured values that have been obtained in step S201 employing the correction values used in step S211 or S214.

Next, in step S207, correction values are calculated in the case where the position and orientation measured values by the position and orientation sensor 103 that have been obtained in step S201, are corrected by using the index identified in step S205. Methods for correcting position and orientation measured values by the position and orientation sensor 103 by using an index include a method in which only one of the rotation component and translation component of position and orientation measured values is corrected so that, based on position and orientation measured values by the position and orientation sensor 103, the position of the index on an image surface obtained by projecting a three-dimensional position of the index on the image, and the position on the image surface, of the index detected from the image coincide with each other. Here, the correction value refers to an amount representing the difference between before and after the correction, in each of the position orientation measured values by position and orientation sensor 103. For the above-described method, the correction value becomes one having either one of the rotation component or the translation component.

Other correction methods for correcting the position and orientation measured values include a method that assumes the position and orientation measured values as initial position and orientation values, and that repeatedly corrects the position and orientation values so that, based on the position and orientation measured values by the position and orientation sensor 103, the difference between the position of the index on the image surface obtained by projecting a three-dimensional position of the index on the image, and the position on the image surface, of the index detected from the image is reduced to a minimum. The correction value in this case becomes one including both the rotation component and the translation component.

As described above, in step S207, such correction values, for correcting position and orientation values to more correct position and orientation values, are calculated. Here, in some cases, the correction method for a sensor's measurement value allows more effective correction changes in accordance with conditions of the index identified by the picked-up image or in the process of calculation of the correction values in step S207. Such being the situation, under certain circumstances, the above-described correction method using an index is changed over in step S208, and based on the correction value that has been changed over, the correction values of the sensor's measurement values is again calculated in step S207. Possible methods for changing over the correction method include a variety of methods, such as a method for changing over a correction method in accordance with the information amount of markers (i.e., to put it simply, the number of markers, or the like) that could be detected or identified; a method determined by the measurement range in position and orientation exist from which a sensor's measurement value before correction is outputted, after relating each correction method to a respective one of the measurement ranges in advance; and a method selectively changed over by hand. Any methods, including, but not limited to the above, for changing over a correction method may be used.

The processing so far performed from step S201 to step S208 are steps for processing measured results at one time. As can be seen from step S216 described later, the overall processing in this embodiment is not only for processing measured values at one time, but is a process constituting a loop such that a series of processing steps with respect to measured values obtained at one time are repeated again at a next time. Therefore, except for the case where this loop is processed for the first time, when the next step S209 is executed, correction values to be stored and accumulated in step 210 (described later) already exist.

In step S209, by using the correction values for the past n-times (where n is a finite integer of at least 1) from the correction values accumulated in step S210, and the correction values at the current time that have been obtained in step S207, correction values to be used at the current time are calculated. A detailed explanation of calculation method is provided below.

In this explanation of the calculation method, t is a current time, t-1 is the time at one time before the current time t, and t-i is the time at i-times before the current time t. Out of the correction values calculated in step S207, their rotation components are each represented by R(t), and their translation components are each represented by T(t). In the correction values at the time at i-times before the current time that were calculated in step S210, their rotation components are each represented by R'(t-i), and their translation components are each represented by T'(t-i). Here, R(t) and R'(t-i) each denotes a four-dimensional vector that is represented by a quaternion as a representing method for rotation, and that has a magnitude of 1. On the other hand, T(t) and T'(t-i) each denotes a three-dimensional vector representing a movement amount in a three-dimensional space. Then, the rotation component (R(t)) and translation component (T(t)) of the correction value actually used at the current time can be calculated by the following Equation 1 and Equation 2, respectively.

$$R(t) = \frac{\sum_{i=1}^{n} w(t)R'(t-i) + w(0)R(t)}{\left\|\sum_{i=1}^{n} w(i)R'(t-i) + w(0)R(t)\right\|} \quad (1)$$

$$T(t) = \frac{\left\{\sum_{i=1}^{n} w(i)T'(t-i) + w(0)T(t)\right\}}{\sum_{i=1}^{n} w(i)} \quad (2)$$

Numerical values w(i)(i=0, 1 . . . n) used in Equation 1 and Equation 2 are weighting factors, with each being arbitrary positive real numbers. If every value of w(i) is 1, it follows that Equation 1 and Equation 2 each average the correction values for the past n-times and for the correction values obtained in step S207. In Equation 1, the denominator represents the magnitude of the vector sum represented by the numerator. By changing the value of n, w(i), or the values of both n and w(i), it is possible to adjust the degree of usage of each of the past correction values. When n=1, there is provided a method using only results at the time immediately before the current time. Here, the purpose of using a quaternion as a method for representing rotation is to facilitate a weighted averaging operation. When two rotation transformations represented by a quaternion are performed, the method is widely used in which interpolation of the two rotation transformations is performed by normalizing the vector sum of the quaternion to perform spherical linear interpolation. The above-described method is a processing operation in which weighted spherical linear interpolation is performed among a large number of rotation transformations. Weighting factors w(i) may be such that every value of w(i) is 1, but generally used weighting factors are such that the weighting value increases as i decreases (i.e., as the time comes nearer to the current time). When the above-described step S209 is performed for the first time, i.e., when the processing is first-time processing with respect to a process constituting a loop, or when, in step S210, the number of the times when correction values were stored in the past is smaller than n, the processing of the above-described step S209 is executed using the correction values for the number of times m(0≦m<n) accumulated in the past in step S210.

Next, in step S210, the correction values obtained in step S209 are stored and accumulated in the memory 108 as correction values at the current time. In this embodiment, a buffer for storing at least n correction values are prepared in the memory 108 in advance, and the oldest stored values are replaced with correction values at the current time. In this manner, correction values for n-times or more are always accumulated. If the cumulative number is less than n, correction values are written into a buffer having nothing stored therein, instead of overwriting the buffer data stored in the past. Here, by using an input instruction from the keyboard 109, the number n of buffers may be adapted to be designatable. For example, an upward-arrow key and a downward-arrow key, respectively, are assigned the instruction to increase n and to decrease n, and it is checked whether either of them has been pushed. If so, n is increased or decreased.

As the correction values to be stored as correction values at the current time, the correction values obtained in step S207 may be used instead of using the correction values obtained in step S209. When using this method, all correction values accumulated cease to be ones that have been calculated using the respective past correction values. As a result, the correction values used for calculation are strictly to be calculated from only information until the time at n-times before the current time. Conversely, in the method in which the correction values obtained in step S209 are stored in step S210, all correction values stored as past correction values become ones calculated by using the correction values for past n-times from respective points in time. As a consequence, the correction values at the current time become correction values that indirectly use even correction values before past n-times from the current time. This is not a matter of superiority or inferiority. Either of the two methods may be selectively used according to the circumstances.

In step S211, by using the correction values at the current time obtained in step S209, the position and orientation measured values obtained in step S201 are corrected. This method allows the accuracy of measured values by the position and orientation sensor 103 having large errors to be enhanced. In addition, correction values calculated using the correction results for the past n-times is employed, and therefore, even if the correction method described in step S208 is changed over, the occurrence of a steep change in correction values at the moment of the changeover of correction method can be prevented, thus implementing a smooth changeover of correction values. Likewise, this method can prevent a steep change in correction values that can possibly occur when a marker is changed over in the case where a plurality of markers is used, and that is perceived, as a problem, by the method disclosed in the patent document (1) (JP 11-136706).

In other words, processing operation in the case where n=1, and the results in step S209 are used for the correction values stored in step S210, and where events at the times of changeovers between a plurality of markers are estimated, equates to processing operation corresponding to the correction method disclosed in the patent document (1) (JP 11-136706). Therefore, the position and orientation estimating method according to the present invention is a method which is generalized so that a similar concept to that of the correction method disclosed in the patent document (1) (JP 11-136706) can be applied to other fields, and which is worth being positioned as an expanded method such as to become a more effective method regarding usage method for correction values in the past.

Thereafter, the processing advances to step S215, and the creation and rendering of a mixed reality space is performed using position and orientation values obtained by correcting position and orientation measured values. For example, with respect to an image area for rendering prepared in the graphics card 110, rendering is performed against the backdrop of the image of the real space obtained in step S202, and virtual object data and virtual space data previously prepared in the memory 108 based on the position and orientation values obtained in step S211, are overwritten with rendering, thereby creating a rendered image in which a real space and virtual space are integrally mixed. The rendered image obtained in the graphics card is transmitted from the graphics card 110 to the display device 104, and is watched by a user equipped with the HMD 101 and experiencing a mixed reality space. The image area for rendering may be prepared in the memory 108 instead of in the graphics card 110.

Next, reference will be made to processing in the case where no index is detected in the above-described step S204 and in the case where no identified index was found in step S206. In these cases, processing proceeds to step S212. These two cases correspond to situations in which there is no index usable for correcting position and orientation measured values. In such cases, conventionally, performing correction by index has been given up, and a method has been adopted in which position and orientation measured values with large errors are used as they are. In the fourth method described in "Description of the Related Art", as pointed out as an inherent problem in "SUMMARY OF THE INVENTION", the above-described method eventually uses the measured values by the sensor just as they are although they take a smooth changeover into account. In contrast, processing of step S212 through step S214 that is described below, attempts to increase the accuracy by performing correction by an index despite such cases.

First, in step S212, it is checked whether there are correction values obtained in the past time, namely, whether there are correction values stored in step S210. The case where there are no past correction values refers to the case where, in this embodiment constituting a loop, no index could be detected (or identified) in the first-time step. This case is a specific case that can occur immediately after the operation starts in this embodiment. In such a case, in step S213, position and orientation measured values are employed as they are. On the other hand, for ordinary operations, because there are past correction values accumulated, the determination in step S212 is "Yes", and processing proceeds to S214.

In step S214, correction values are determined based on the past correction values stored. In this embodiment, the position and orientation measure values obtained in step S201 are corrected by using the latest correction values out of the accumulated correction values. After step S213 or step S214 has been completed, processing proceeds to step S215. In step S215, creation and rendering of a mixed reality space are performed using the position and orientation values obtained as described above. For example, in a state where the index is sufficiently detected or identified, even if the detection of the index ends in failure, the reduction in measurement accuracy with respect to position and orientation can be prevented by virtue of the processing in step S214, since the latest correction values in the past are to be applied for the calculation of position and orientation.

Upon completion of step S215, processing proceeds to step S216 where it is determined whether this series of processing is completed. This determination may be performed, for example, by making use of the determination as to whether the "q" key on the keyboard 109 has been pushed. When no end instruction is provided, processing returns to the start position in this embodiment, and the series of processing from step S201 to step S215 is executed.

According to this embodiment, when performing an estimation by correcting the position and orientation of a photographing device or object using an index, it is possible to eliminate the discontinuity of correction occurring when a correction method is changed over, and simultaneously, to increase the accuracy at the time when the index becomes unusable.

Second Embodiment

In the first embodiment, it is assumed that a camera, and a position and orientation sensor are fixed to each other, and that, with the camera being movable, an image of an index fixed to a real space is picked up. However, the present invention is also applicable to the case where the camera is fixed, and an object equipped with the position and orientation sensor and indices is moved.

Figure 3:
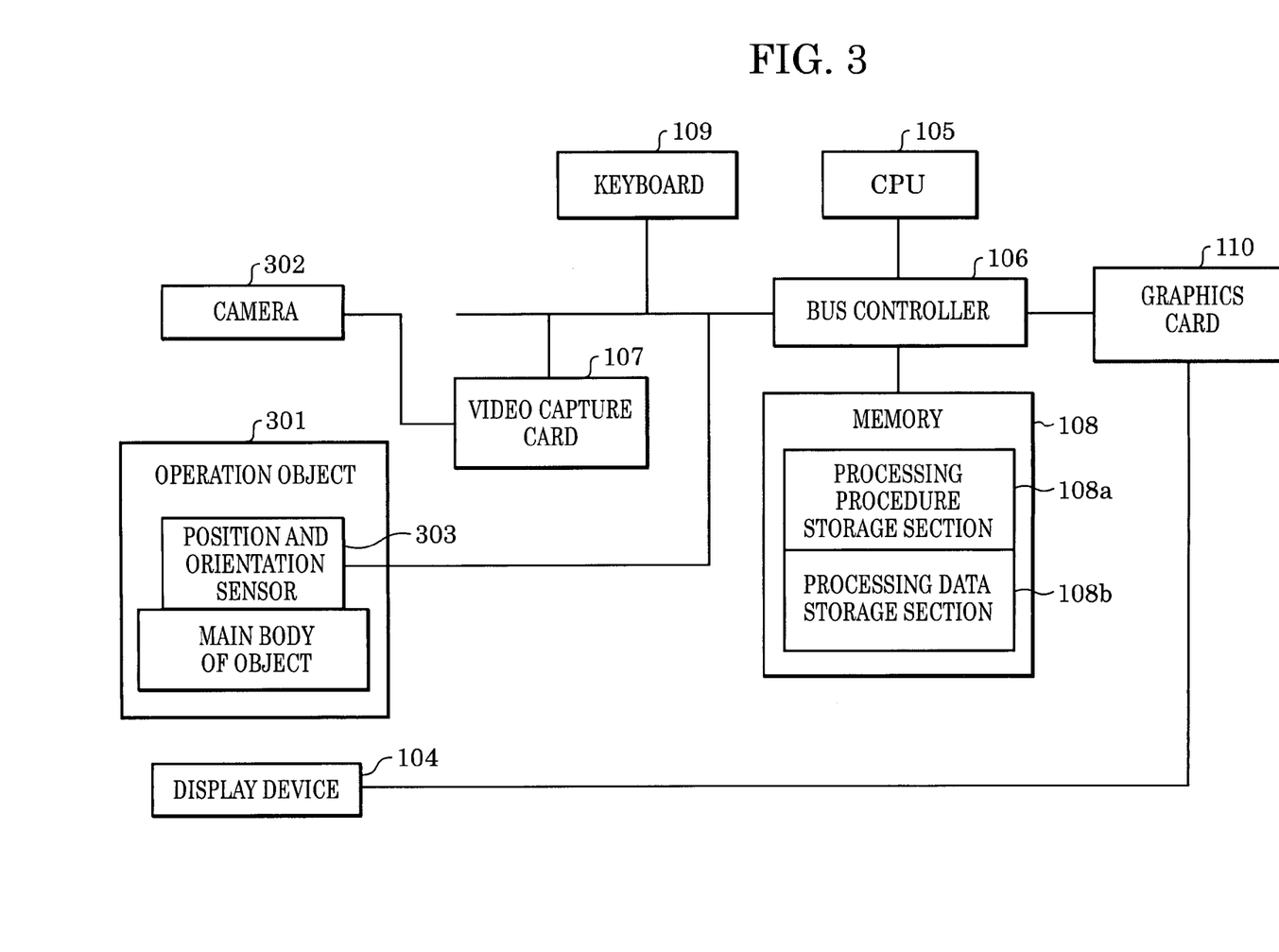
FIG. 3 is a block diagram showing the functional construction of an apparatus for implementing position and orientation estimation processing according to a second embodiment of the present invention.

FIG. 3 shows a construction (block diagram of a system) for performing the position and orientation estimation processing according to a second embodiment of the present invention. Referring to FIG. 3, an operation object 301 is constructed by fixing a position and orientation sensor 303 to the main body of the object, which constitutes a target object of an operation. A camera 302 is one capable of photographing the operation object 301. Other components denoted by reference numerals 104 to 110 are the same as those denoted by reference numerals 104 to 110 in FIG. 1 and described above.

Figure 2:
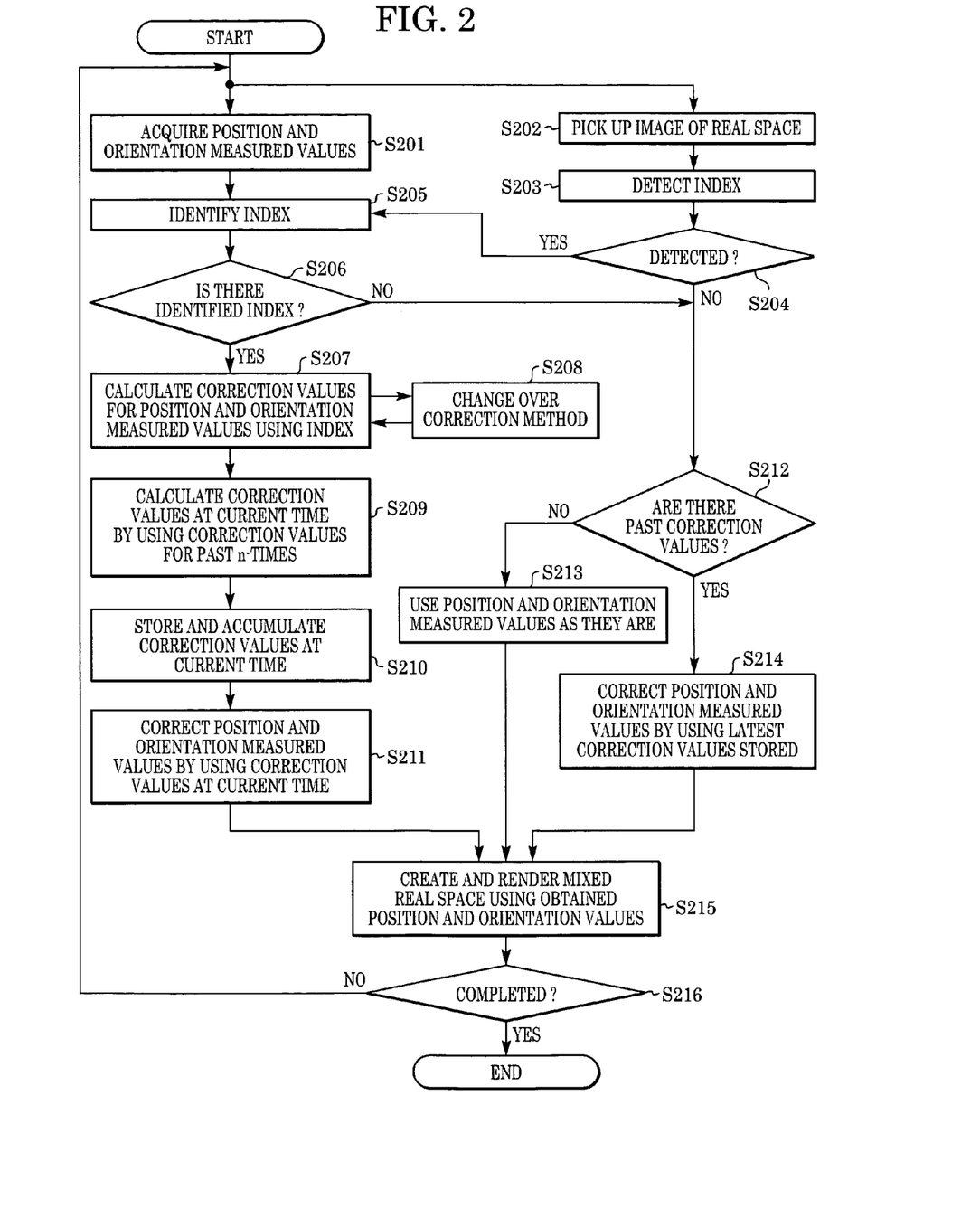
FIG. 2 is a flowchart showing position and orientation estimation processing.

The flowchart of position and orientation estimation processing by the apparatus with the above-described construction is similar to the flowchart in the first embodiment shown in FIG. 2. The second embodiment differs from the first embodiment in the calculation method for the coordinate transformation calculation performed in steps S205, S207, S211, and S214. The coordinate transformation matrix representing the position and orientation of the camera in the case where the camera moves and a real space is fixed (i.e., the case of the first embodiment), and the coordinate transformation matrix representing the position and orientation of the object in the case where the camera is fixed and a target object moves (i.e., the case of the second embodiment) are mutually in an inverse matrix relation. Between them, there is only a difference with respect to which matrix is to be treated as the reference matrix. There is no essential difference between them. Therefore, by the same processing as that in the flowchart shown in FIG. 2, the processing for determining the position and orientation values of the object in the second embodiment can be implemented.

Third Embodiment

In the first embodiment, it is assumed that a camera and position and orientation sensor are fixed to each other, and that, with the camera being movable, an image of an index fixed to a real space is picked up; while in the second embodiment, it is assumed that the camera is fixed, and that an object equipped with the position and orientation sensor and indices is moved. In the third embodiment, it is assumed that a position and orientation sensor and a camera is fixed to each other, that another position and orientation sensor is fixed to the object, and that the camera and object are each movable.

As is evident from the foregoing, according to the above-described embodiments, when performing an estimation by correcting the position and orientation of a photographing device or object using an index or indices, it is possible to eliminate the discontinuity of correction occurring when a correction method is changed over, and simultaneously, to increase the accuracy at the time when the index or indices become unusable.

A system or apparatus with a storage medium that has recorded software program code that implements the functions of the above-described embodiments may be supplied.

A computer (alternatively CPU or micro-processing unit (MPU)) for the system or apparatus can read and execute the program code stored in the storage medium.

A flexible disk, hard disk, optical disk, magneto-optical disk, compact disk—read-only memory (CD-ROM), compact disk—rewriteable (CD-R), magnetic tape, nonvolatile memory card, read-only memory (ROM), etc. can be used as the storage media for supplying program code.

The present invention incorporates not only a case where the functions of the above-described embodiments are implemented by executing the program code read out by the computer, but also a case where, based on the instructions of the program code, an operating system (OS) or the like running on the computer performs a part or all of actual processing to implement the functions of the above-described embodiments with the processing.

The present invention also incorporates a case where the program code read out from the storage medium are written into a memory provided in a function expansion unit connected to a function expansion board or the computer, and thereafter, based on the instructions of the program code, a CPU or the like provided in the function expansion board or the function expansion unit performs a portion or all of actual processing to achieve the functions of the above-described embodiments with the processing.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A method for estimating a position and an orientation of an object in a real space, the method comprising:
   (a) inputting position and orientation values from a sensor fixed to the object;
   (b) inputting a picked-up image obtained by picking up an image of the real space by an image pickup device;
   (c) detecting an index from the picked-up image;
   (d) selecting a correction method, from a plurality of correction methods, for calculating correction values for correcting the position and orientation values;
   (e) calculating correction values for the position and orientation values based on the detected index, using the selected correction method;
   (f) calculating correction values at a current time based on the correction values and a predetermined number of past correction values stored in a memory;
   (g) accumulating in the memory the correction values calculated in (f); and
   (h) correcting the position and orientation values based on the correction values calculated in (f).

2. The method according to claim 1, wherein the object comprises the image pickup device.

3. The method according to claim 1, wherein the image pickup device is fixed and the object is movable.

4. The method according to claim 1, wherein (f) comprises dividing each correction value into a rotation component and a translation component, and calculating the new correction value for each of the rotation component and the translation component.

5. The method according to claim 4, wherein a quaternion is used for representing the rotation component.

6. The method according to claim 1, wherein, when the index cannot be detected in (c), (e) comprises calculating correction values for the position and orientation values based on the correction values stored in the memory.

7. The method according to claim 1, wherein, when the index cannot be detected in (c), (e) comprises calculating correction values for the position and orientation values based on latest correction values stored in the memory.

8. A storage medium readable by a computer that stores a control program for causing the computer to perform the method as recited in claim 1.

9. An information processing method comprising:
   performing the method as recited in claim 1 for estimating the position and the orientation of the object in the real space;
   creating a virtual image based on the corrected position and orientation values; and
   presenting a mixed reality by combining the virtual image with the picked-up image.

10. A method for estimating a position and an orientation of an object in a real space, the method comprising:
    (a) inputting position and orientation values from a sensor for measuring a position and an orientation;
    (b) detecting a plurality of indices from a picked-up image obtained by picking up an image of a real space by an image pickup device;
    (c) calculating correction values for correcting the position and orientation values based on the detection results of the plurality of indices;
    (d) calculating correction values for a current time based on the correction values and a predetermined number of past correction values stored in a memory;
    (e) accumulating the correction values calculated in (d) in the memory; and
    (f) correcting the position and orientation values based on the correction values calculated in (d),
    wherein, when a predetermined number of the indices cannot be detected in (b), (f) corrects the position and orientation values using the correction values stored in (e).

11. A storage medium readable by a computer that stores a control program for causing the computer to perform the method as recited in claim 10.

12. An information processing method comprising:
    performing the method as recited in claim 10 for estimating the position and the orientation of the object in the real space;
    creating a virtual image based on the position and orientation values; and presenting a mixed reality by combining the virtual image with the picked up image.

13. An apparatus for estimating a position and an orientation of an object in a real space, the apparatus comprising:
    a first input unit adapted to input position and orientation values from a sensor fixed to the object, for measuring a position and an orientation;
    a second input unit adapted to input a picked-up image obtained by picking up an image of a real space by an image pickup device;
    a detecting unit adapted to detect an index from the picked-up image;
    a first calculating unit adapted to calculate correction values for correcting the position and orientation values obtained by the first input unit based on the detection result of the index;
    a second calculating unit adapted to calculate new correction values, based on the correction values obtained by the first calculating unit and a predetermined number of past correction values stored in a memory;

an accumulating unit adapted to accumulate in the memory the correction values calculated by either of the first and second calculating units; and a correcting unit adapted to correct the position and orientation values inputted by the first input unit, based on the correction values obtained by the second calculating unit, wherein the first calculating unit selects a correction method to be used for calculating correction values from among a plurality of correction methods, and calculates correction values based on the selected correction method.

14. An apparatus for estimating a position and an orientation of an object in a real space, the apparatus comprising:

a position and orientation measured value input unit adapted to input position and orientation values from a position and orientation sensor;

a detecting unit adapted to detect a plurality of indices from a picked-up image obtained by picking up an image of a real space by an image pickup device;

a first calculating unit adapted to calculate correction values for correcting the position and orientation values based on the detection results of the plurality of indices;

a second calculating unit adapted to calculate new correction values, based on the correction values obtained by the first calculating unit and a predetermined number of past correction values stored in a memory;

an accumulating unit adapted to accumulate in the memory the correction values calculated by either of the first and second calculating units; and a correcting unit adapted to correct the position and orientation values inputted by the position and orientation measured value input unit, based on the correction values obtained by the second calculating unit, wherein, when a predetermined number of the indices cannot be detected by the detection unit, the correcting unit corrects the position and orientation values using the correction values stored in the accumulating unit.

* * * * *